Figures 4, 5:
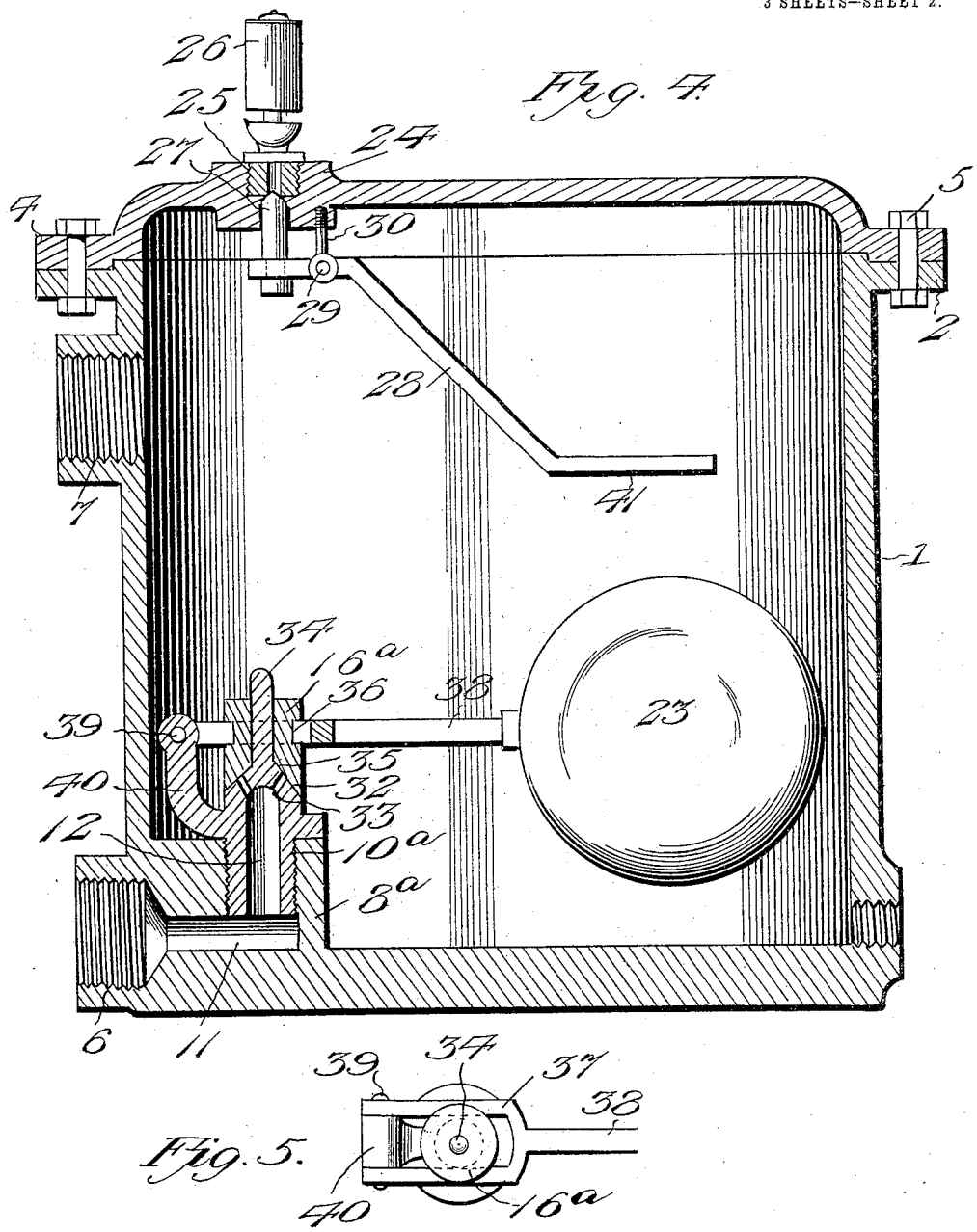

No. 824,554. PATENTED JUNE 26, 1906.
J. T. LINDSTROM.
STEAM TRAP.
APPLICATION FILED JUNE 4, 1904.
3 SHEETS—SHEET 1.
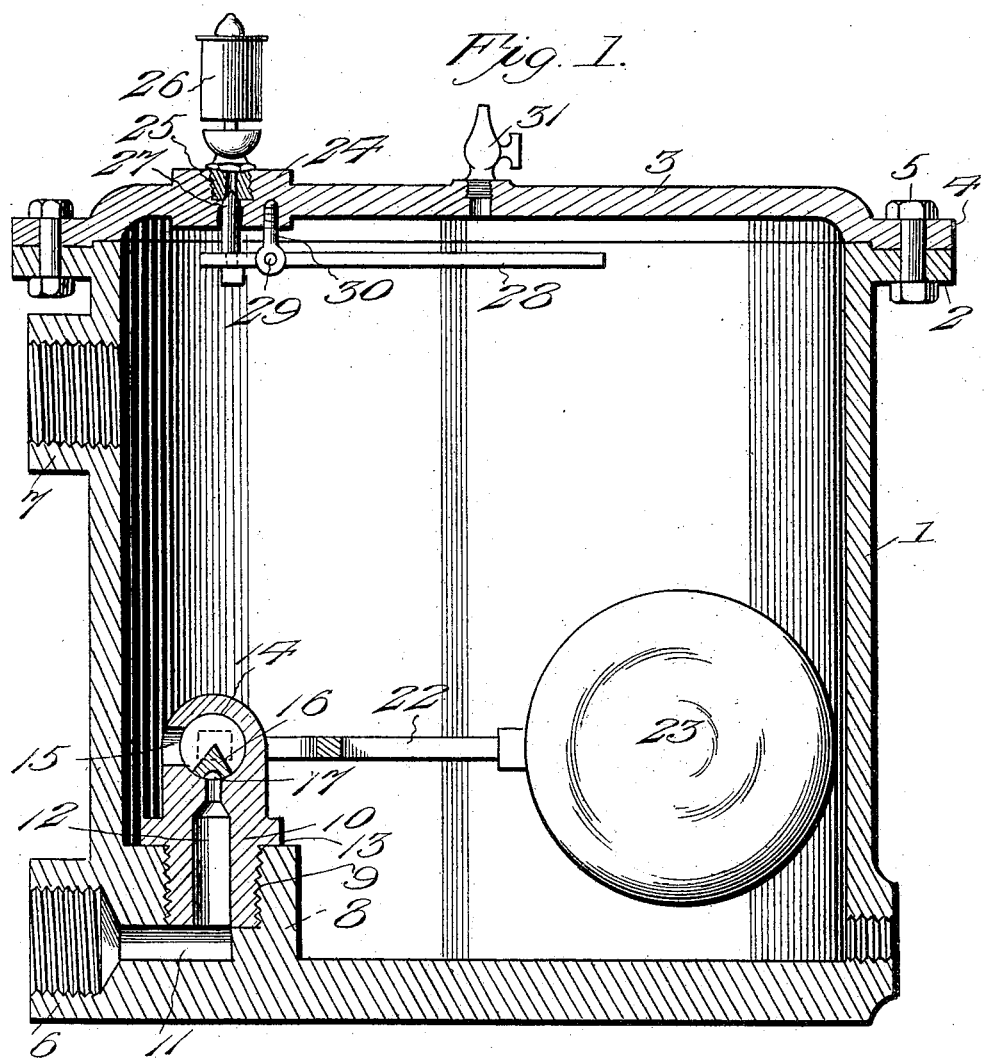
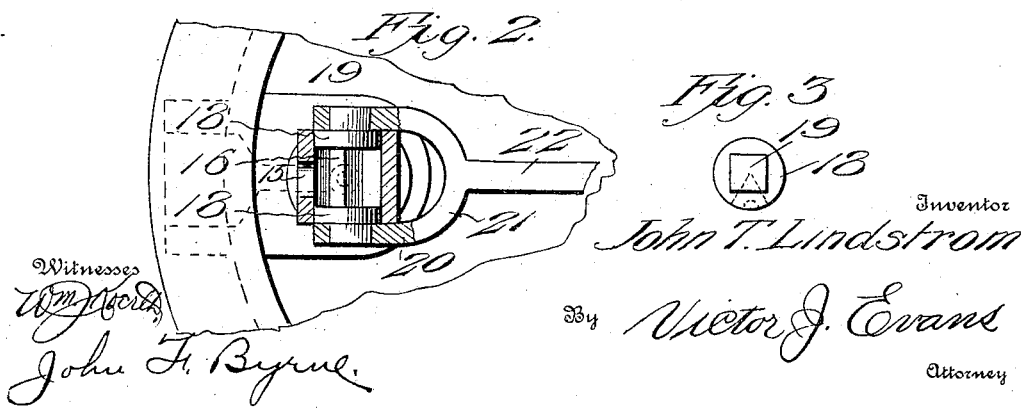
Inventor
John T. Lindstrom
By Victor J. Evans
Attorney
Witnesses No. 824,554. PATENTED JUNE 26, 1906.
J. T. LINDSTROM.
STEAM TRAP.
APPLICATION FILED JUNE 4, 1904.

3 SHEETS—SHEET 2.

Witnesses
Wm. Aberth
John F. Byrne

Inventor
John T. Lindstrom,
By Victor J. Evans
Attorney

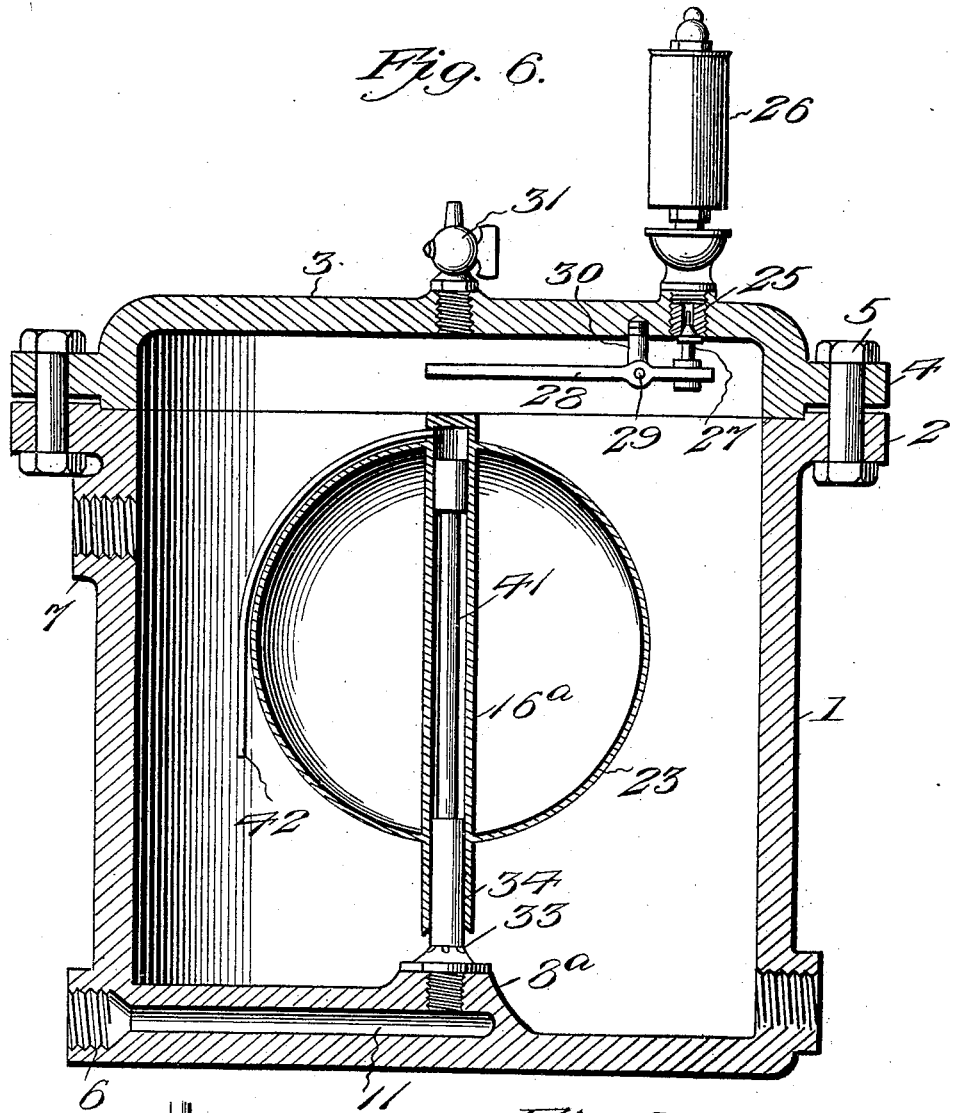

UNITED STATES PATENT OFFICE.

JOHN T. LINDSTROM, OF ALLENTOWN, PENNSYLVANIA.

STEAM-TRAP.

No. 824,554.     Specification of Letters Patent.     Patented June 26, 1906.

Application filed June 4, 1904. Serial No. 211,185.

*To all whom it may concern:*

Be it known that I, JOHN T. LINDSTROM, a citizen of the United States, residing at Allentown, in the county of Lehigh and State of Pennsylvania, have invented new and useful Improvements in Steam-Traps, of which the following is a specification.

This invention relates to steam-traps, the object of the invention being to provide a steam-trap adapted to be used either as a high-pressure or low-pressure trap, the said trap being entirely automatic in operation, so that the water of condensation governs the outlet-valve, opening and closing the same in accordance with the level of water in the trap. The improved trap also embodies means whereby upon the clogging or congestion of the outlet by reason of the accumulation of scale, sediment, or impurities an alarm may be sounded, so as to notify an attendant and give sufficient notice that the apparatus is not in proper working order.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a vertical sectional view of a steam-trap embodying the present invention and adapted for use in connection with high-pressure cylinders. Fig. 2 is a detail sectional plan view of the outlet-valve. Fig. 3 is an end view of the outlet-valve *per se*. Fig. 4 is a section similar to Fig. 1, showing an arrangement especially adapted for low-pressure cylinders. Fig. 5 is a plan view of the outlet-valve mechanism. Fig. 6 is a view similar to Fig. 4, illustrating a further modified form of my invention. Fig. 7 is a detail sectional elevation of a supporting-post extending upwardly into the trap and having outlet means in the lower extremity thereof, said post being adapted to be used in connection with the modified form of my invention. Fig. 8 shows detail views of the signal-valve-operating lever and fulcrum-post therefor.

Referring to the drawings, 1 designates the trap-casing, which may be of any suitable size, said casing being flanged at the top, as shown at 2, to receive a lid or cover 3, which is correspondingly flanged, as shown at 4, to receive the clamp or fastening-bolts 5, which pass through flanges 2 and 3 and firmly secure the lid or cover 3 to the casing 1, the joint between the casing and the cover being ground to make the same air and liquid tight.

The casing is provided with an external boss 6, forming the outlet, and another boss 7, located at a higher point and forming the inlet, said bosses being interiorly threaded to receive suitable inlet and outlet connections.

In the lower portion of the casing and adjacent to the outlet-boss 6 the casing is provided with an internal boss 8, which is internally screw-threaded, as shown at 9, to receive an exteriorly-threaded valve-seat 10, which is thus adapted to be screwed into the boss 8 and easily removed when it gets out of order, so that it may be readily repaired and replaced.

Extending inward from the boss 6 is an outlet-passage 11, which is arranged at right angles to the outlet-port 12 of the tubular valve-seat 10. The passage 11 may be formed by coring out the boss 8 or by boring or drilling the same, as may be preferred. The valve-seat 10 is provided with a shoulder 13, which bears directly against the extremity of the boss 8, as shown in Fig. 1. In its upper portion the valve-seat is provided with a cylindrical bore or chamber 14, with which a lateral inlet-port 15 communicates, the port 15 admitting the water to the valve-chamber. Arranged in the valve-chamber 14 is an oscillatory valve 16, the main body portion of which is substantially triangular, as shown, and provided with a groove or recess 17, adapted to register with the outlet-port 12 of the valve-seat, said recess 17 decreasing the amount of material in the valve, and thus reducing the cost of manufacture. The end portions of the valve are cylindrical or disk-shaped, as shown at 18, and fit in the end portions of the valve-chamber, as shown in Fig. 2. Beyond the portions 18 the valve is provided with squared extremities 19, which are received in correspondingly-shaped openings in the arms 20 of a fork 21 on the end of a lever-stem 22, to the opposite end of which is connected a float 23, arranged within the casing 1. As the water rises in the casing the float moves upward, and by means of the lever-stem 22 the valve 16 is partially revolved, so as to expose the outlet-port 12 and permit the water to move through said outlet-port 12, passage 11, and outlet 6. As the water is exhausted the float descends and again closes the outlet-valve 16, the operation thus being entirely automatic.

The cover or lid 3 is provided with an internally-threaded boss 24, into which is screwed a tubular valve-seat 25 of a whistle 26. Coöperating with the valve-seat 25 is a pin-valve 27, having a pointed or conical end, as shown, and connected with one arm of a whistle-controlling lever 28, which is fulcrumed at 29 on a bracket 30, connected with the cover. The lever 28 is arranged within the casing 1, and the longer arm thereof is arranged over the float and in the path of said float, so that when the water reaches an abnormal level in the casing the float will rock the lever 28, unseat the pin-valve 27, and allow the incoming steam to pass to the whistle and operate the same, thus notifying an attendant.

31 represents a relief-cock connected with the lid or cover 3 for giving vent to the steam for emergency purposes.

In Figs. 4 and 5 I have illustrated a slightly-different form of valve which is somewhat cheaper in construction and adapted for use in connection with low-pressure engines or cylinders. The tubular valve-seat $10^a$ is screwed into the boss $8^a$, the same as in Fig. 1, while the upper end of the valve-seat is cone-shaped, as shown at 32, and provided with a plurality of ports 33, leading from the conical surface 32 to the bore of the valve-seat. The valve-seat is also provided with an upwardly-projecting stem or guide 34, upon which is slidably mounted the outlet-valve $16^a$, the lower end of which is provided with a conical recess 35 to fit the cone-shaped portion of the valve-seat, as clearly shown in Fig. 4. The valve is provided with an annular groove 36, which is engaged by the branches or arms of the fork 37 of a lever-stem 38, which carries the float 23 at its outer end. The lever-stem is fulcrumed at 39 on the arm or bracket 40, connected directly to the valve-seat $10^a$. It will also be noted by reference to Fig. 4 that the lever 28 is provided with a depressed terminal portion 41, so that the float 23 does not have to rise to such an elevation as in Fig. 1 before it comes in contact with the lever 28 and vibrates the latter, so as to throw the whistle into operation.

The modification of the invention as disclosed in Fig. 6 of the drawings differs from the construction disclosed in Fig. 4 in positioning the boss $8^a$ in the center of the casing and in directly mounting the float 23 upon the valve $16^a$ without the interposition of the lever-stem 38. The guide-stem 34 in this instance has its intermediate portion 41 of smaller diameter than its upper and lower extremities to reduce the friction in the part coöperating therewith, and the valve $16^a$ has its upper end closed. The diameter of the float 23 is less than the length of the valve $16^a$, so that the lower end of the latter may be free to cover the openings 33 and to have the upper end project above the float for engagement with the lever 28, said upper end of the valve being increased in thickness for wearing purposes. To obstruct the formation of a vacuum in the upper end of the valve $16^a$, an air-escape pipe 42 is connected to the upper end of said valve and depends over the float.

From the foregoing description it will be understood that the parts of this invention are adapted to either high or low pressure traps and that the trap is entirely automatic in operation, and in case the outlet or outlet-valve gets out of order an alarm is sounded, so as to notify an attendant. The free end of the lever 28 may be arranged at any suitable elevation to be operated upon by the float upon the water reaching a predetermined level.

Having thus described the invention, what is claimed as new is—

1. In a valve structure for steam-traps and the like, a casing, a valve-seat therein having a cylindrical chamber, a valve in said chamber comprising disk-shaped members and a substantially triangular body portion connecting said disk-shaped members, a float, and a stem-lever having a bifurcated end connected with said disk members of the valve.

2. In a valve structure for steam-traps and the like, a casing having an outlet and an internal boss formed with a threaded socket and a discharge-passage leading therefrom to the outlet, a valve-seat screwed into said socket and formed with a shoulder bearing against the upper side of the boss, and also formed at its upper end with a cylindrical chamber provided in its sides with bearing-openings and having a lateral inlet, the seat being further formed with a vertical passage leading from said chamber to the discharge-passage, a valve mounted within said chamber and comprising disk-shaped members, an intermediate triangular body portion, and squared extremities beyond the disk-shaped members, said disk-shaped members being journaled in and closing the bearing-openings in the ends of the chamber and mounting the valve therein for oscillatory movement, a lever-stem provided with a forked end, the arms of said forked end being apertured to receive the square extremities of the valve, and a float secured to said lever-stem.

In testimony whereof I affix my signature in presence of two witnesses.

JOHN T. LINDSTROM.

Witnesses:
 EDWIN H. STULL,
 U. S. LITZENBERG.